United States Patent Office 3,436,369
Patented Apr. 1, 1969

3,436,369
POLYOLEFINS STABILIZED WITH SUBSTITUTED METHYLENE PIPERIDINE METHYLENE PIPERIDINE-1-OXIDES
Atsushi Kitaoka, Nobeoka, and Keisuke Murayama, Syoji Morimura, Saburo Akagi, Tomoyuki Kurumada, and Ichiro Watanabe, Tokyo, Japan, assignors to Sankyo Company Limited, Tokyo, Japan, and Asahi Kasei Kogyo Kabushiki Kaisha, Osaka Prefecture, Japan
No Drawing. Filed July 12, 1967, Ser. No. 652,701
Claims priority, application Japan, July 15, 1966, 41/46,349
Int. Cl. C08f 45/60
U.S. Cl. 260—45.8                                              6 Claims

ABSTRACT OF THE DISCLOSURE

Polyolefins, particularly polyethylenes and polypropylene are stabilized against photo-deterioration under the exposure to light by having incorporated therein at least one compound selected from the 2,2,6,6-tetramethyl-4-substituted methylene piperidine-1-oxides in a sufficient amount to inhibit such deterioration.

---

This invention relates to the stabilization of polyolefin. More particularly, it relates to the stabilization of polyolefin against deterioration resulting from exposure to light with piperidine-N-oxides. Still more particularly, it is concerned with the stabilization of polyolefin against such photo-deterioration with a piperidine-N-oxide having the formula

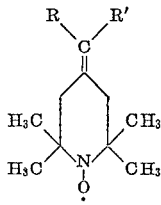

(I)

wherein R and R', which may be the same or different, are cyano group, carboxyl group, alkoxycarbonyl group, carbamoyl group, aliphatic acyl group or aryl group which may be substituted with alkyl, halogen, nitro or hydroxy.

Polyolefins are frequently subjected to photodeterioration when exposed to light such as sunlight or ultraviolet light. For the purpose of stabilizing polyolefins against such deterioration, there have been proposed in the art a great number of light stabilizers, especially such light stabilizers as "Tinuvin P" (the trade name of the light stabilizer containing as active ingredient 2-(2'-hydroxy-5'-methyl)-phenylbenzotriazole and 2,4 - dihydroxybenzophenone. These prior art stabilizers are, however, not satisfactorily effective in the inhibition of deterioration of the polyolefin, especially when employed under the outdoor exposure to sunlight. Thus, the development of the more effective stabilizers would be desired in the art.

As a result of our investigations on light stabilizers, it has been unexpectedly found that the above-mentioned piperidine-N-oxides (I) exhibit an exceptionally high degree of light stability against deterioration of polyolefin accompanied with little thermal sublimation and no coloring or discoloring action on polyolefin.

It is, therefore, an object of this invention to provide the newly found stabilizers for polyolefins against deterioration resulting from exposure to light.

It is another object of this invention to provide polyolefins stabilized against deterioration under the action of light with the above-mentioned piperidine-N-oxides (I).

Still another object of this invention is to provide an improved process for stabilizing polyolefins against deterioration by light which comprises incorporation of the above-mentioned piperidine-N-oxides (I) into the polyolefins.

These and other objects and advantages of this invention will appear in the more detailed description of this invention which follows.

The term "polyolefin" as used herein is intended to include high and low pressure polyethylenes, polypropylene, other polyolefins, for example, polybutadiene, polyisoprene and the like and various olefin copolymers, for example, ethylene-propylene copolymers, styrene-butadiene copolymers, acrylonitrile-butadiene-styrene copolymers and the like.

The aforesaid piperidine N-oxides (I) in this invention are novel compounds unknown in the prior art. Novel piperidine N-oxides (I) may be readily and advantageously obtained by the novel procedure which comprises either (a) reacting 2,2,6,6 - tetramethyl-4-oxopiperidine-1-oxide having the formula

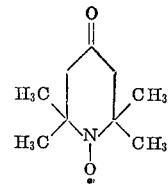

(II)

with a reactive methylene derivative having the formula $$R—CH_2—R'$$ (III)

wherein R and R' are as defined above in the presence of a basic condensing agent to form the aforesaid piperidine-N-oxide (I) or (b) reacting 2,2,6,6-tetramethyl-4-oxopiperidine having the formula

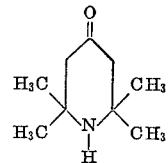

(IV)

with a reactive methylene derivative having the above formula (III) to form the intermediate having the formula

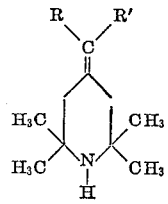

(V)

wherein R and R' are as defined above and treating the intermediate thus obtained with hydrogen peroxide to form the aforesaid piperidine-N-oxide (I) wherein R and R' are the above-defined groups other than cynao group.

In the above Formula I, the groups R and R' may be illustratively represented by cyano, carboxyl, methoxycarbonyl, ethoxycarbonyl, n-propoxycarbonyl, carbamoyl, acetyl, propionyl, butyryl, phenyl, o-, m- or p-tolyl, o-, m- or p-chloro or (bromo) phenyl, o-, m- or p-nitrophenyl, o-, m- or p- hydroxyphenyl, naphthyl and the like.

Representative examples of the piperidine-N-oxides (I) employed in this invention include the following piperidine-N-oxides;

2,2,6,6-tetramethyl-4-(α-cyanobenzylidene)piperidine-1-oxide,
2,2,6,6-tetramethyl-4-(α-cyano-α-ethoxycarbonylmethylene)-piperidine-1-oxide,
2,2,6,6-tetramethyl-4-(α-carbamoyl-α-ethoxycarbonylmethylene)piperidine-1-oxide,
2,2,6,6-tetramethyl-4-(α,α-dicyanomethylene)piperidine-1-oxide,
2,2,6,6-tetramethyl-4-(α-carbamoylbenzylidene)piperidine-1-oxide, and
2,2,6,6-tetramethyl-4-(α,α-dicarbamoylmethylene)piperidine-1-oxide.

Preparation of the piperidine-N-oxide (I) to be employed in this invention will be more fully understood by reference to the following Preparations A and B, which are, of course, given solely for the purpose of illustration.

PREPARATION A

Preparation of 2,2,6,6-tetramethyl-4-(α-cyanobenzylidene)-piperidine-1-oxide

To a solution of 2.4 g. of metallic potassium in 50 ml. of tert.-butanol was added 10 g. of benzyl cyanide and to the resulting mixture was added 7 g. of 2,2,6,6-tetramethyl-4-oxopiperidine-1-oxide with ice-cooling and stirring. The mixture thus obtained was stirred with ice-cooling for 20 minutes and then heated to 80° C. for additional 10 minutes. At the end of this time, the reaction mixture was immediately ice-cooled. The solvent was distilled off from the reaction mixture, the residue was admixed with 20 ml. of iced water and, after neutralization with 30% aqueous acetic acid, the whole mixture were extracted several times with benzene. The combined extracts were dried over anhydrous potassium carbonate and the solvent was distilled off. The crystalline residue thus obtained was recrystallized from methanol to give the desired product, melting at 131–132° C.

*Analysis.*—Calculated for $C_{17}H_{21}ON_2$: C, 75.80; H, 7.86; N, 10.40. Found: C, 76.20; H, 7.96; N, 10.59.

PREPARATION B

Preparation of 2,2,6,6-tetramethyl-4-(α-carbamoylbenzylidene)-piperidine-1-oxide (a) To a solution 15.5 g. of 2,2,6,6-tetramethyl-4-oxopiperidine and 12.3 g. of benzyl cyanide in 100 ml. of ethanol was added dropwise at 25–30° C. a solution of 5 g. of sodium hydroxide in 10 ml. of water. After completion of the dropwise addition, the reaction mixture was heated to 60–70° C. with stirring for 5 hours. After removal of the solvent by distillation, the residue was taken up with cold water and then the resulting mixture was allowed to stand at ambient temperature. The crystalline substance which precipitated out was recovered by filtration, washed with water and then recrystallized from aqueous ethanol to give 2,2,6,6-tetramethyl-4-(α-cyanobenzylidene)piperidine, melting at 128–129° C.

(b) To a solution of 2.5 g. of the 2,2,6,6-tetramethyl-4-(α-cyanobenzylidene)piperidine obtained as described above in 30 ml. of methanol was added dropwise with stirring at room temperature a solution of 0.04 g. of ethylenediamine-tetraacetic acid and 0.03 g. of sodium tungstate in 3 ml. of water and subsequently 10 ml. of 30% aqueous hydrogen peroxide. The resulting mixture was stirred at room temperature for 8 hours and then heated to 60–65° C. for additional 8 hours. Then, the solvent was distilled off and the residue was taken up with aqueous potassium carbonate. The crystalline substance precipitated out in situ and the whole mixture was extracted several times with benzene. The combined extracts were washed with water and the benzene was distilled off. The crystalline substance thus obtained was then recrystallized from methanol to give the desired product, melting at 161–162° C.

*Analysis.*—Calculated for $C_{17}H_{23}O_2N_2$: C, 71.05; H, 8.07; N, 9.75. Found: C, 70.90; H, 8.23; N, 9.98.

Where the piperidine-N-oxides of the above-mentioned Formula I are to be employed in polyolefin for the purpose of stabilization, they may be incorporated or blended into polyolefin by any of the conventional methods commonly used for incorporating or blending commercially available stabilizers such as antioxidants into the polyolefin. The stabilizers of this invention may be incorporated or blended into polyolefin at any desired stage prior to the preparation of shaped articles.

The amount of the piperidine-N-oxide to be employed in the polyolefin in accordance with this invention can be widely varied, depending upon the properties and particular use of the stabilized polyolefin and other factors, but generally it is preferred to employ the piperidine-N-oxide (I) in the range of concentrations of about 0.05–2% by weight, most preferably concentrations of about 0.1–1% by weight, these concentrations being based upon the weight of the polyolefin employed.

Other additives commonly used in the art, including other known antioxidants and ultraviolet absorbents, may be optionally utilized together with the piperidine-N-oxides (I) in this invention. If necessary, an optional combination of two or more piperidine-N-oxides may be satisfactorily employed in this invention in order to achieve the better results.

The following non-limiting examples are given only for the purpose of illustrating the excellent light resistance of the piperidine-N-oxides (I) in the polyolefin in accordance with this invention.

All parts are given by weight unless otherwise indicated.

EXAMPLE 1

With 100 parts of polypropylene in a mortar was intimately admixtured 0.25 part of the novel stabilizer of this invention selected from those indicated in the following Table I.

The resulting mixture was preheated to 215° C. under a pressure of 10 kg./cm.$^2$ for 2 minutes, and then compression-molded into a sheet of 0.5 mm. thick under the following condition, i.e., at 215° C. under a pressure of 150 kg./cm.$^2$ for 0.5 minute.

As a control, the polypropylene sheets were prepared in a similar manner to that described above with the commercially available stabilizer indicated in the following Table I or without any of such stabilizers, for comparative purpose.

Then, all of these sheets thus formed were tested for the brittle time (which means the time, expressed in terms of hour, until the test sheet will become brittle) under ultraviolet irradiation at a temperature of 45° C. by means of the fade meter prescribed in the JIS–L–1044-3-8.

The test results are listed in the following Table I.

TABLE I

Stabilizer.—piperidine-N-oxide
of this invention: Brittle time (hour)
2,2,6,6-tetramethyl-4-(α-cyanobenzylidene)-piperidine-1-oxide _____ 260
2,2,6,6-tetramethyl-4-(α-cyano-α-ethoxycarbonylmethylene)piperidine-1-oxide _____ 380
2,2,6,6-tetramethyl-4-(α-carbamoyl-α-ethoxycarbonylmethylene)piperidine-1-oxide _____ 280
2,2,6,6-tetramethyl-4-(α,α-dicyanomethylene)-piperidine-1-oxide _____ 240
2,2,6,6-tetramethyl-4-(α-carbamoyl-benzylidene)piperidine-1-oxide _____ 320

TABLE I—Continued

Stabilizer.—piperidine-N-oxide
of this invention: Brittle time (hour)
2,2,6,6-tetramethyl-4-(α,α-dicarbamoyl-
    methylene)piperidine-1-oxide _____ 340
Commercially available stabilizer:
  Tinuvin P _____ 80
  2,2'-dihydroxy-3,3'-di-tert.-butyl-5,5'-dimethyl-
    diphenyl methane _____ 100
  None _____ 40

From the foregoing results it will be apparent that the piperidine-N-oxides (I) of this invention exhibit superior stabilizing effect in preventing polyolefin, especially polypropylene, from the deterioration under the exposure to light, as compared with known light stabilizers.

EXAMPLE 2

An intimately admixtured polymer stock composed of 100 parts of high density polyethylene having a density of 0.958 and a melt index of 2 and 0.25 part of the novel stabilizer of this invention selected from those indicated in the following Table II was molten-extruded and granulated by means of a conventional extruder provided with a mixing type screw of 25 mm. diameter.

The granulated polymer stock thus obtained was preheated to 200° C. under a pressure of 10 kg./cm.² for 5 minutes and then compression-molded into a sheet of 0.5 mm. thick under the following condition, i.e., at 200° C. under a pressure of 200 kg./cm.² for 2 minutes.

As a control, the polyethylene sheets were prepared in a similar manner to that described above with the commercially available stabilizer indicated in the Table II or without any of such stabilizers, for comparative purpose.

Then, all of these sheets thus formed were tested for the "brittle time" with the same testing procedure and condition as described in the Example 1.

The test results are listed in the following Table II.

TABLE II

Stabilizer.—piperidine-N-oxide
of this invention: Brittle time (hour)
2,26,6-tetramethyl-4-(α-cyano-α-ethoxycar-
    bonylmethylene)piperidine-1-oxide _____ 980
2,2,6,6-tetramethyl-4-(α-carbamoyl-α-ethoxy-
    carbonylmethylene)piperidine-1-oxide _____ 920
Commercially available stabilizer:
  2,6-di-tert.-butyl-4-methyl phenol (commonly
    referred to as "BHT") _____ 480
  None _____ 360

From the foregoing results it will be apparent that the piperidine-N-oxides (I) of this invention exhibit superior stabilizing effect in preventing polyolefin, especially polyethylene, from the deterioration under the exposure to light, as compared with known light stabilizer.

What is claimed is:
1. Polyolefin stabilized against deterioration by light wherein there is incorporated, in a sufficient amount to inhibit the deterioration, a compound having the formula

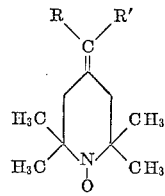

wherein R and R', which may be the same or different, are cyano group, carboxyl group, alkoxycarbonyl group, carbamoyl group, aliphatic acyl group or aryl group which may be substituted with alkyl group, halogen atom, nitro group or hydroxy group.

2. Polyolefin according to claim 1 wherein there is incorporated an amount of 0.05–2% by weight of a compound selected from the group consisting of:

2,2,6,6-tetramethyl - 4 - (α-cyanobenzylidene)piperidine-1-oxide;
2,2,6,6 - tetramethyl-4-(α-cyano-α-ethoxycarbonylmethylene)piperidine-1-oxide;
2,2,6,6-tetramethyl-4 - (α-carbamoyl-α - ethoxycarbonylmethylene)piperidine-1-oxide;
2,2,6,6 - tetramethyl-4-(α,α - dicyanomethylene)piperidine-1-oxide;
2,2,6,6-tetramethyl - 4 - (α-carbamoylbenzylidene)piperidine-1-oxide; and
2,2,6,6-tetramethyl-4 - (α,α - dicarbamoylmethylene)piperidene-1-oxide.

3. Polyethylene stabilized against deterioration by light wherein there is incorporated, in a sufficient amount to inhibit the deterioration, a compound having the formula

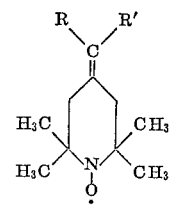

wherein R and R', which may be the same or different, are cyano group, carboxyl group, alkoxycarbonyl group, carbamoyl group, aliphatic acyl group or aryl group which may be substituted with alkyl group, halogen atom, nitro group or hydroxy group.

4. Polyethylene according to claim 3 wherein there is incorporated an amount of 0.05–2% by weight of a compound selected from the group consisting of 2,2,6,6-tetramethyl - 4 - (α-cyanobenzylidene)piperidine-1-oxide;
2,2,6,6 - tetramethyl-4-(α-cyano-α-ethoxycarbonylmethylene)piperidine-1-oxide;
2,2,6,6-tetramethyl-4 - (α-carbamoyl-α - ethoxycarbonylmethylene)piperidine-1-oxide;
2,2,6,6 - tetramethyl-4-(α,α - dicyanomethylene)piperidine-1-oxide;
2,2,6,6-tetramethyl - 4 - (α-carbamoylbenzylidene)piperidine-1-oxide; and
2,2,6,6-tetramethyl-4 - (α,α - dicarbamoylmethylene)piperidene-1-oxide.

5. Polypropylene stabilized against deterioration by light wherein there is incorporated, in a sufficient amount to inhibit the deterioration, a compound having the formula

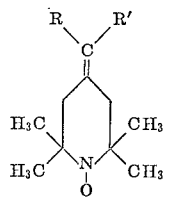

wherein R and R', which may be the same or different, are cyano group, carboxyl group, alkoxycarbonyl group, carbamoyl group, aliphatic acyl group or aryl group which may be substituted with alkyl group, halogen atom, nitro group or hydroxy group.

6. Polypropylene according to claim 5 wherein there is incorporated an amount of 0.05–2% by weight of a compound selected from the group consisting of 2,2,6,6-tetramethyl - 4 - (α-cyanobenzylidene)piperidine-1-oxide;

2,2,6,6 - tetramethyl-4-(α-cyano-α-ethoxycarbonylmethylene)piperidine-1-oxide;

2,2,6,6-tetramethyl-4 - (α-carbamoyl-α - ethoxycarbonylmethylene)piperidine-1-oxide;

2,2,6,6 - tetramethyl-4-(α,α - dicyanomethylene)piperidine-1-oxide;

2,2,6,6-tetramethyl - 4 - (α-carbamoylbenzylidene)piperidine-1-oxide; and 2,2,6,6-tetramethyl-4 - (α,α - dicarbamoylmethylene)piperidene-1-oxide.

References Cited
UNITED STATES PATENTS

| | | | |
|---|---|---|---|
| 3,325,499 | 6/1967 | Poos | 260—294 |
| 3,334,103 | 8/1967 | Feldman et al. | 260—290 |

DONALD E. CZAJA, *Primary Examiner.*

R. A. WHITE, *Assistant Examiner.*

U.S. Cl. X.R.

260—45.95, 293